No. 876,829. PATENTED JAN. 14, 1908.
T. NELSON.
INTERLOCKING CLEVIS.
APPLICATION FILED AUG. 19, 1907.
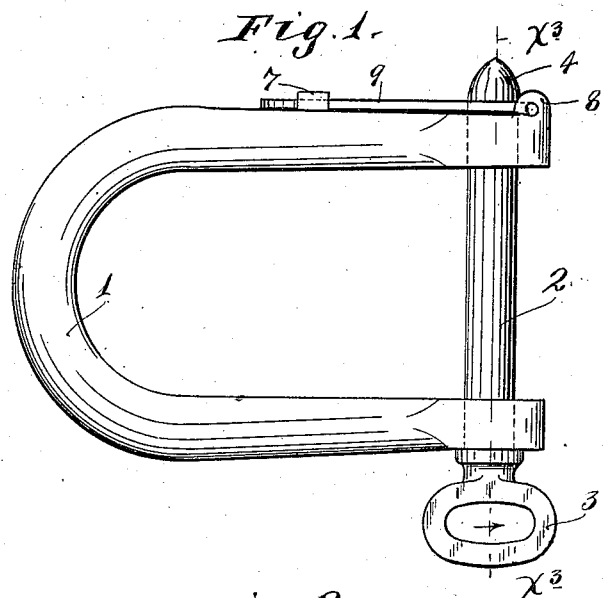
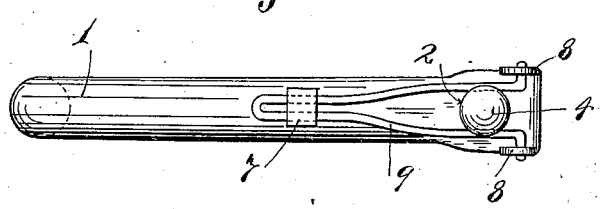
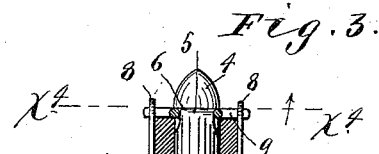
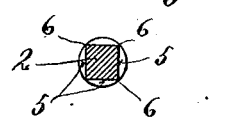
Witnesses
A. H. Opsahl
Malie Hoel
Inventor
Tidemand Nelson
By his Attorneys
Williamson & Merchant

UNITED STATES PATENT OFFICE.

TIDEMAND NELSON, OF STARBUCK, MINNESOTA.

INTERLOCKING CLEVIS.

No. 876,829.  Specification of Letters Patent.  Patented Jan. 14, 1908.

Application filed August 19, 1907. Serial No. 389,244.

*To all whom it may concern:*

Be it known that I, TIDEMAND NELSON, a citizen of the United States, residing at Starbuck, in the county of Pope and State of Minnesota, have invented certain new and useful Improvements in Interlocking Clevises; and I do hereby declare the following to be a full, clear, and exact description of the invention, such as will enable others skilled in the art to which it appertains to make and use the same.

My invention has for its object to provide an improved interlocking clevis, and to this end the invention consists of the novel devices and combinations of devices hereinafter described and defined in the claims.

The invention is illustrated in the accompanying drawings, wherein like characters indicate like parts throughout the several views.

Figure 1 is a plan view, showing the improved clevis. Fig. 2 is a side elevation of the same. Fig. 3 is a vertical section taken on the line $x^3 x^3$ of Fig. 1; and Fig. 4 is a horizontal section taken through the clevis bolt or pin on the line $x^4 x^4$ of Fig. 3.

The numeral 1 indicates the yoke which is provided at the ends of its prongs with seats that closely fit a detachable clevis bolt or pin 2. Said bolt 2 is provided at one end with a head 3, and at the other end with a tapered point 4. The bolt 2 is further provided just above its tapered end 4 with four lock shoulders 5, and four releasing shoulders 6, the purpose of which will presently appear. The lock shoulders 5 are formed by reducing the lock bolt 2 sufficiently to form a square (see Fig. 4) and the four corners of this square form the releasing shoulders, said shoulders being flush with the body of the bolt 2. One of the prongs of the yoke 1 is provided near its intermediate portion with a pair of lugs 7 and at its projecting end with a pair of perforated guide lugs 8, one being located on either side of said prong.

A pair of laterally spaced lock springs 9, are secured to the yoke 1 by the lugs 7. The lugs 7 are cast perpendicular on the yoke 1 and are then turned or pounded over the lock springs 9 to hold the same in place. As shown, the lock springs 9 are made from a single piece of metal bent upon itself, but if desired each lock spring 9 may be made from separate pieces of metal. The free ends of said lock springs 9 are bent laterally ninety degrees and in opposite directions from each other and work through and are guided by the guide lugs 8.

As is evident, by forcing the bolt 2 into working position, its tapered point 4 will force the lock springs 9 apart so as to permit said lock springs 9 to pass the lock shoulders 5 and be held thereby, thus locking the bolt 2 against endwise movement. To remove the bolt 2 from working position, the bolt 2 is first rotated one-eighth of a revolution, in which position the releasing shoulders 6 will force the lock springs 9 apart sufficiently to permit said bolt 2 to be withdrawn from working position.

The device described, while simple and of small cost, is highly efficient for the purposes had in view.

What I claim is:

1. The combination with a clevis yoke having seats formed in the prongs thereof, of a clevis bolt fitting said seats, lock shoulders and releasing shoulders formed on the opposite sides of said bolt, a pair of laterally spaced lock springs carried by one of the prongs for engagement with said lock shoulders to lock the clevis bolt in working position, and the releasing shoulder for releasing the lock springs from the lock shoulders under a rotary movement of the clevis bolt, substantially as described.

2. The combination with a clevis yoke having seats formed in the prongs thereof, of a clevis bolt fitting said seats, lock shoulders and releasing shoulders formed on the opposite sides of said bolt, a pair of laterally spaced lock springs carried by one of the prongs for engagement with said lock shoulders to lock the clevis bolt in working position, and the releasing shoulder for releasing the lock springs from the lock shoulders under a rotary movement of the clevis bolt, and means for guiding the free ends of said lock springs, substantially as described.

3. The combination with a clevis yoke having seats formed in the prongs thereof, one of said prongs being provided with a pair of laterally spaced guide lugs, of a headed clevis bolt fitting said seats and having a tapered end, lock shoulders and releasing shoulders formed on opposite sides of said bolt, a pair of laterally spaced lock springs, lugs on the guide lug equipped prong for securing said lock springs thereto, said lock springs having engagement with the lock shoulders to lock the clevis bolt in working position, and having their free ends guided by the guide lugs, and the releasing shoulders releasing said lock springs from said lock shoulders under a rotary movement of the clevis bolt, substantially as described.

In testimony whereof I affix my signature in presence of two witnesses.

TIDEMAND NELSON.

Witnesses:
   G. I. ENGEBERTSON,
   BEN EVJEN.